United States Patent [19]

De George et al.

[11] 4,080,855

[45] Mar. 28, 1978

[54] TIP TABLE WORKTABLE SECTION

[75] Inventors: Robert P. De George, Kenmore; Paul R. Brown, Akron, both of Ohio

[73] Assignee: Houdaille Industries, Inc., Buffalo, N.Y.

[21] Appl. No.: 719,825

[22] Filed: Sep. 2, 1976

[51] Int. Cl.² ............................................. B26D 5/30
[52] U.S. Cl. ........................................ 83/71; 83/157; 83/277; 83/400
[58] Field of Search ............... 83/71, 79, 157, 277, 83/552, 400, 399; 269/56, 289 R, 309

[56] References Cited

U.S. PATENT DOCUMENTS

| | | | |
|---|---|---|---|
| 2,701,017 | 2/1955 | Wiedemann | 83/552 X |
| 3,448,645 | 6/1969 | Graf et al. | 83/277 X |
| 3,631,750 | 1/1972 | Hanni | 83/157 |
| 3,717,061 | 2/1973 | Daniels | 83/552 X |
| 3,785,231 | 1/1974 | Lake, Jr. et al. | 83/157 X |
| 3,961,549 | 6/1976 | Smith | 83/552 |

*Primary Examiner*—Frank T. Yost
*Attorney, Agent, or Firm*—Hill, Gross, Van Santen, Steadman, Chiara & Simpson

[57] ABSTRACT

A worktable for use in association with machine tools is illustrated which has a section including a side edge of the worktable hingedly connected to the table supporting member whereby the section is tiltable under power to automatically unload a workpiece from the table. The invention is shown in connection with a workpiece gripping and moving carriage which moves the workpiece relative to the machine tool and, after completion of machining, moves the workpiece to a position on the tip table section. Control members prevent actuation of the tip table until after the workpiece gripper has deposited the workpiece on the tip table clear of the machine tool and then withdrawn to a position fully out of contact with the workpiece.

9 Claims, 5 Drawing Figures

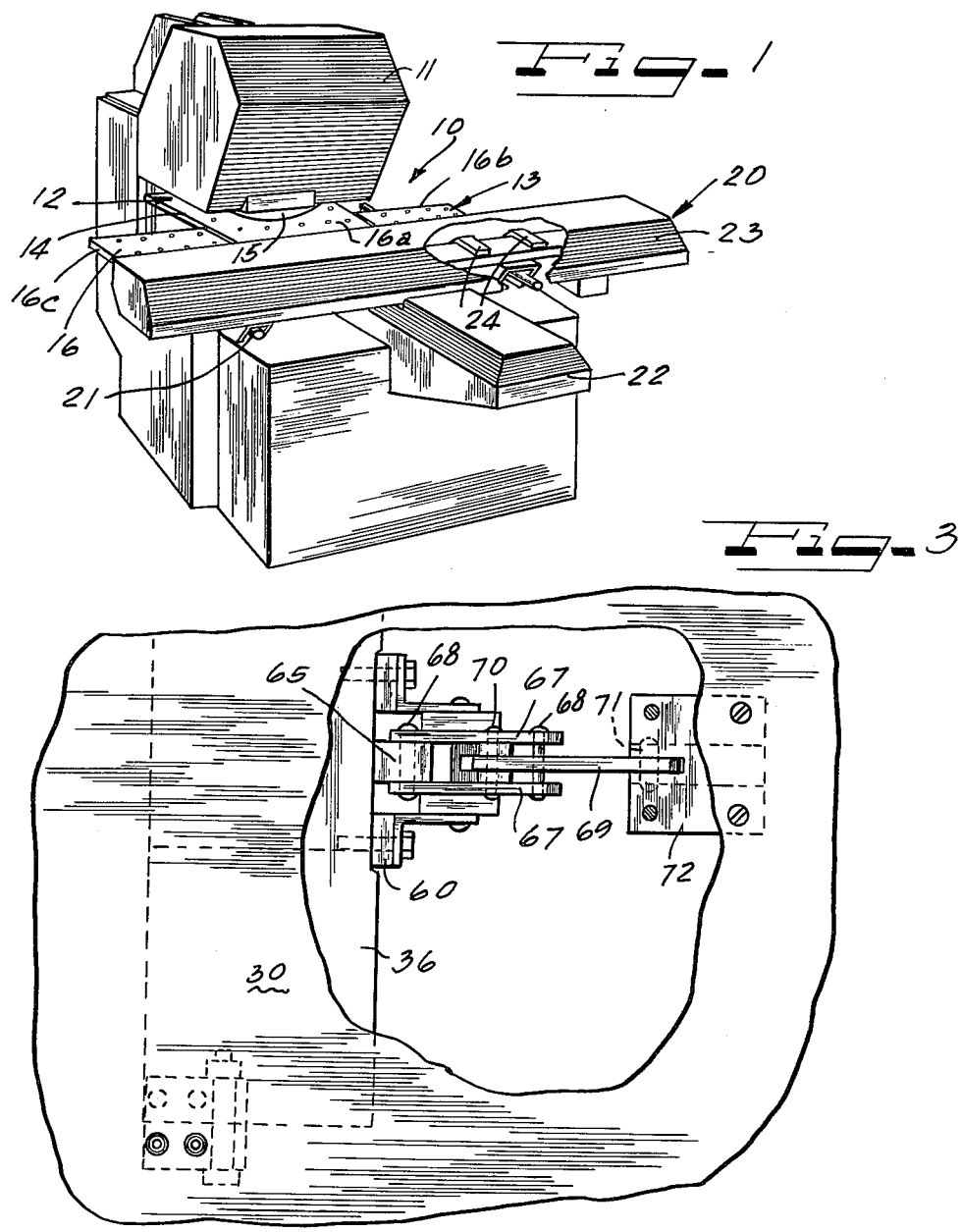
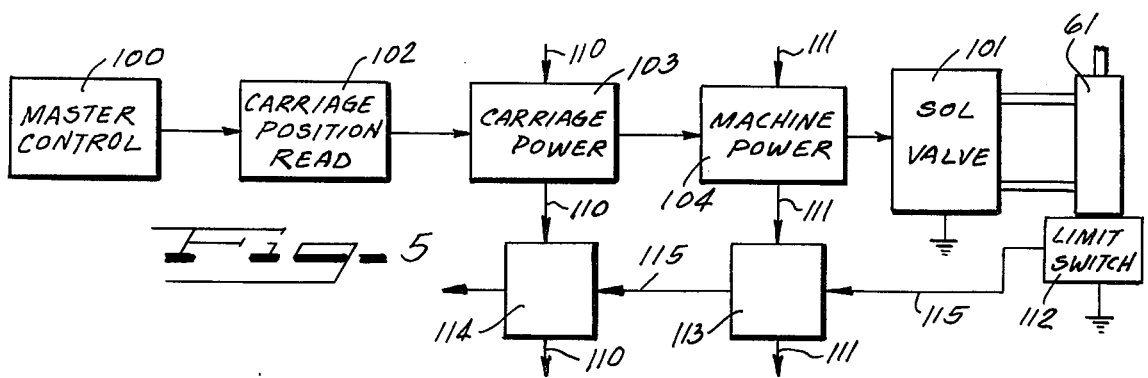

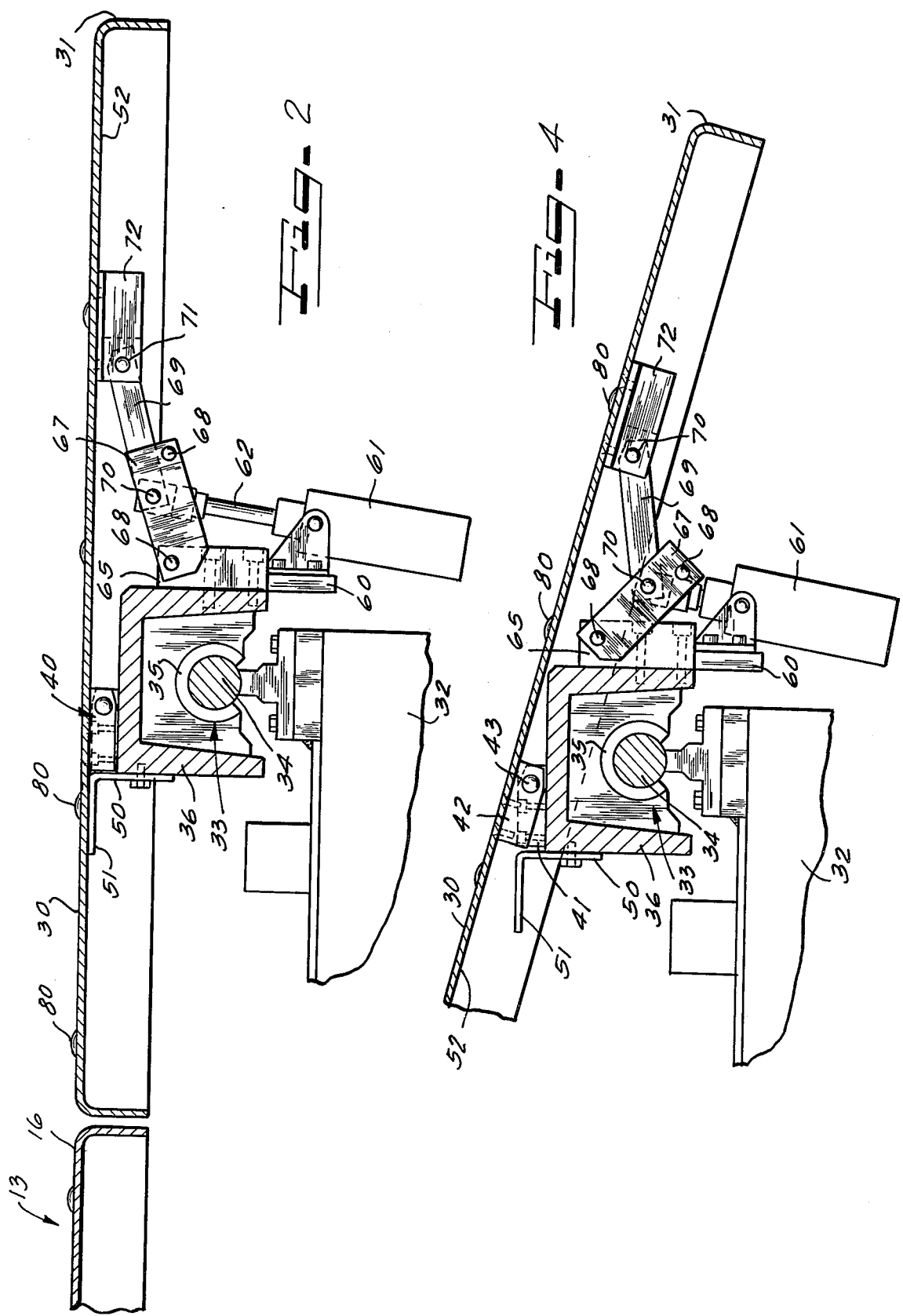

TIP TABLE WORKTABLE SECTION

BACKGROUND OF THE INVENTION

1. Field of the Invention

This invention relates to machine tools and more particularly to a worktable assembly for machine tools.

2. Prior Art

Machine tools, and particularly tools such as turret punch presses are normally provided with a workpiece supporting table. In the case of turret punch presses, the table has an innermost portion which partially surrounds the lower turret and a forward portion extending a substantial distance in front of the turret. The forward portion has lateral side portions which extend horizontally of the center line of the turrets a considerable distance. A workpiece, such as a sheet of metal, which is to be acted upon by the tools carried in the turrets is then positioned on the worktable and is moved on the worktable into the desired position with respect to the tools carried in the turret.

In order to facilitate movement of the workpiece on the table, the table is normally equipped with anti-friction means, such as rollers or balls. Workpiece gripper carriages are often provided in association with such worktables and include workpiece edge gripper members which are movable in both the X and Y axis with the Y axis lying on a line extending from the center of the turret through the center of the punch station.

Memory controls such as punch tape readers or computers are used to control movement of the workpiece grippers and the gripper carriage so as to accurately position any desired portion of the workpiece with respect to the punch station.

Thus machining of the workpiece is substantially fully automatic from the time the workpiece is placed into the proper position with respect to the grippers to the time machining is completed and the workpiece has been moved free of the turrets.

Thereafter, it is necessary for the machine operator to lift the machined workpiece off of the support table and to place it elsewhere, normally in a storage cart. Additionally, of course, it is necessary for the machine operator to initially lift the unmachined workpiece onto the support table.

Since such machine tools are normally capable of working on quarter inch and thicker workpieces which may have an overall dimension of greater than 3 feet by 4 feet, the workpieces are quite heavy and may be both difficult and dangerous for the operator to move.

It would therefore be an advance in the art to provide method and mechanism for assisting in the removal and/or loading of workpieces on support tables for machine tools.

SUMMARY OF THE INVENTION

Our invention provides a workpiece support table which has a portion thereof hingeably connected to the support base for the support table in such a manner that the portion is tiltable with respect to the remainder of the support table.

The portion includes a side edge section of the support table and is acted upon by a power member such as a pneumatic or hydraulic cylinder through a linkage which may be an overcenter linkage capable of maintaining the table in a locked horizontal position. Actuation of the power member is preferably automatically sequenced to the operation of the machine tool, and in particular to the gripper carriage.

When used as an unloading assist, the gripper carriage will be programmed to, after completion on the workpiece by the machine tool, move the workpiece in one or more sequence moves to a position where the majority of the workpiece rests on the top of the tiltable portion of the table with the workpiece entirely clear of the machine tool turret. Thereafter the grippers will release the workpiece and the gripper carriage will be returned to a position completely clear of the workpiece. When this has occurred, the power member will be actuated and the tip table will tilt with respect to the remainder of the table from a horizontal position to a part vertical position, which may be on the order of 15° from the horizontal. Because the tip table is equipped with anti-friction means, the workpiece will slide off of the support table. By positioning a cart or the like in the path of the workpiece, it is assured that no assistance is necessary from the operator for removal of the workpiece from the support table.

Additionally, such a table may be used to assist in loading the workpiece onto the support table by initially setting the support table tip table portion in a tilted position allowing the workpiece to be set at an equal angle and pushed upwardly onto the tip table portion which will thereafter tilt to the horizontal thus reducing the dead lift distance through which the operator must lift the workpiece.

It is therefore an object of this invention to provide a workpiece support table which has a tiltable section.

It is another and more important object of this invention to provide a workpiece support table for use in association with machine tools, and particularly turret punch presses, in which the support table has a horizontal section thereof, including a support table edge, which is hingeably connected to a table support member and which is tiltable under power from the horizontal position to a position angled with respect to the horizontal.

It is another and more specific object of this invention to provide a workpiece support table for use in connection with machine tool turret punch presses wherein the support table has an edge including section thereof which is tiltable with respect to the remainder of the support table from a horizontal position to an edge down tilted position at an angle to the horizontal, the tiltable portion including an anti-friction surface, and tilting of the portion being controlled in dependent response to positioning of a workpiece on the section by movement of a power workpiece gripper carriage.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a perspective view of a turret punch press equipped with a workpiece gripper carriage.

FIG. 2 is a fragmentary cross sectional view of a portion of the support table showing the tiltable section in a horizontal position.

FIG. 3 is a fragmentary top plan view of the support table section of FIG. 2 with portions broken away to show underlying portions and with other underlying portions shown by broken lines.

FIG. 4 is a view similar to FIG. 2 showing the tiltable section of the table angled from the horizontal.

FIG. 5 is a diagrammatic view illustrating an actuation control for the tilt table.

DESCRIPTION OF THE PREFERRED EMBODIMENT

FIG. 1 illustrates, in a perspective view, a machine tool 10 and particularly a turret punch press which has a shrouded body 11 encompassing upper and lower tool carrying turrets with a gap 12 therebetween into which a workpiece is fed. A support table 13 has an inward portion 14 partially surrounding the lower turret 15 and an outer portion 16 extending outwardly in front of the turrets and laterally to both sides thereof. A workpiece carriage assembly 20 is slide mounted as at 21 and includes a Y axis control 22 and an X axis control 23 which cooperate to move workpiece grippers 24 both towards and away from the turret and laterally thereof. Examples of such workpiece grippers are fully described in U.S. Pat. No. 3,456,536 to Daniels and U.S. Pat. No. 3,595,112 to De George, the teachings of which are herein incorporated by reference.

Both the machine tool and the workpiece gripper carriage are automatically controlled in their operation and movement by control systems such as punch tape readers, computers and the like. Examples of such control systems are found in U.S. Pat. No. 3,596,266 and 3,634,662 to Slawson and U.S. Pat. No. 3,622,763 to Barber, the teachings of which are herein incorporated by reference.

In addition, the control system for movement of the workpiece gripper carriage may include systems allowing the grippers to move the workpiece, to release the workpiece to withdraw to a different position on the workpiece, to reclamp the workpiece, and to further move the workpiece, which control systems are of extreme desirability when large workpieces are being worked upon. An example of a control system such as discussed is described in U.S. Pat. No. 3,349,658 to Johns et al, the teachings of which are herein incorporated by reference.

Normally the support table 13 has a stationary central section consisting of the inward portion 14 and the central part 16a of the outer portion 16. The lateral side portions 16b and 16c of the outer portion 16 are mounted for linear movement on the slide mounts 21 as a part of the overall gripper carriage 20. The slide mounts 21 may include linear anti-friction elements.

According to this invention, one lateral side portion 16c of the forward portion 16 of the support table has at least a portion thereof 30 which is tiltable with respect to the remainder of the table to facilitate loading or unloading.

As illustrated in FIG. 2, the tip table portion 30, including a side edge 31 of the support table is attached to the underlying support frame 32 through a slide mount 21 arrangment including a rod 34 received in a bushing 35 carried by a bracket 36. The slide arrangement 33 provides support for the table portion 30. The bracket 36 has a scissors arm hinge 40 with one arm 41 thereof attached to the bracket 36 and the other arm 42 attached to the undersurface of the tilt table portion 30, the arms being pivotably connected to one another through a pivot pin 43. An "L" bracket 50 is attached to the bracket 36 and has a horizontally extending arm 51 which contacts the undersurface 52 of the tip table portion when the tip table is in the horizontal position illustrated in FIG. 2 thereby providing support in that position.

The bracket 36 also has attached thereto a support 60 for a power member 61 such as an hydraulic or pneumatic cylinder having a moving power arm 62. Thus the power member is carried by a portion of the overall machine with, although linearly movable, is stable and which, in turn is carried by the base frame 32.

A block 65 carried by the bracket 36 has links 67 of a toggle type link connection attached thereto through pivot pins 68 at one end of the links. A single arm link 69 is pivotably attached to the links 67 and to the end of the power arm 62 through a pivot connection 70 intermediate the ends of the links 67. Stop bar 68 may also be provided. The opposite end 71 of the link 69 is attached to a bracket 72 carried by the undersurface 52 of the tip table portion 30. The linkage used between the bracket 36 and the table 30 is preferably a toggle link connection having an overcenter travel capability which will assure lockage of the table in operating a horizontal position in the event of failure of pressure or the absence of pressure to the power member 61.

As is illustrated in FIG. 4, when the power arm 62 is withdrawn into the power member 61, the table portion 30 will tilt in an edge 31 down position. The abutment stop 68 may be used to limit this tilting. Preferably the table will tilt to approximately 15° from horizontal. Thus any workpiece placed on top of the table will, due to the anit-friction rollers 80 slide off of the table portion 30.

OPERATION OF TIP TABLE

The operation of the tip table 30 is integrated with the operation of the machine tool and the workpiece gripper carriage, both which are controlled by a control center 100 such as an N/C reader or the like.

After machining of the workpiece has been completed the control will cause the gripper carriage to move the workpiece into position over the tip table section and fully clear of the turrets of the machine tool and the encompassing shroud. Thereafter, the control 100 will cause the grippers to release the workpiece and the grippers will then be cycled to a fully clear position on the opposite side of the X axis center line from the tip table. Additionally the carriage will be cycled on the Y axis so that all of the tip table is to be fully clear of the machine tool.

After the control has caused movement of the carriage and grippers to the fully clear position, it will send a signal to a solenoid valve 101 to actuate the pneumatic or hydraulic cylinder 61. The signal will, at the same time, determine the existence of a number of other predetermined machine conditions. For example, a normally open limit switch 102 or a pair of such switches can be positioned in both the X and Y axis travel range of the gripper carriage. These switches will be closed only by the presence of the carriage and the grippers in the fully clear position. If the switches remain in the open position, thereby indicating that the carriage has not completed its travel to the fully clear position, the signal to the solenoid valve 101 will be blocked. Additionally, normally closed switch 103 in the circuit 110 providing power to the gripper carriage will be moved to a normally open position in the presence of the signal to the solenoid valve 101. This will prevent movement of the gripper carriage during activation of the tip table.

A second normally closed switch 104 in the circuit 111 providing power to the machine tool turret and ram or either of them, can also be provided which will be opened by the signal to the solenoid valve. This will prevent actuation of the machine during the time period that the tip table is activated thereby providing a safety feature.

In order to prevent carriage and machine operation during the time the tip table is tilted, the power member 61 or table section 30 may be equipped with a sensor 112 which closes a circuit 115 including interlocks 113 and 114 in the circuits 111, 110 to block activation of the carriage and machine.

Activation of the tip table can be controlled fully from the control 100 through a time sequence or can be subject to a manual reset if desired.

Although one system of control and interlock is herein described, it should be apparent that other systems can be utilized, the major feature being control of the gripper carriage to move the workpiece clear of the machine tool on the tip table section and then to withdraw the grippers to a position clear of the deposited workpiece before actuation of the tip table.

It can therefore be seen from the above, that our invention provides an automatic workpiece unloader which consists of a tiltable section of the machine tool worktable, preferably an edge section of the Y axis direction moving portion of the table. The tiltable section is power actuated to tilt from a horizontal operating position to an angled from the horizontal unloading position. Controls for a workpiece gripper carriage are provided to move the workpiece, after machining, to a position atop the tiltable section and to thereafter withdraw the tiltable section into a clearance relationship with the machine tool and withdraw the grippers into a clearance relationship with respect to the workpiece. Thereafter power is supplied to tilt the worktable section to automatically unload the workpiece.

Although the teachings of our invention have herein been discussed with reference to specific theories and embodiments, it is to be understood that these are by way of illustration only and that others may wish to utilize our invention in different designs or applications.

We claim as our invention:

1. A machine tool assembly comprising: a tool working station at which tools are caused to act upon a workpiece, a workpiece support table having a first portion in proximity to the working section and a second portion clear of the working section, a device associated with the machine tool assembly sensing the positioning of the workpiece on the support table, a first section of the second portion including an edge thereof hingedly connected to stationary portions of the machine tool assembly, power means for tilting said first section with respect to the remainder of the second portion, and control means associated with the device and power means selectively controlling actuation of the power means in dependent response to the existence of a sensed positioning of the workpiece on the first section clear of the working station.

2. A worktable assembly for machine tools comprising: a table surface with anti-friction means thereon carried by a base for supporting a workpiece, a movable work clamp carriage associated therewith for moving the workpiece, a portion of the table surface including an edge portion hingedly connected to the base and tiltable with respect to the remainder of the table surface, automatic first control means for the carriage effective to move the workpiece onto the portion, power means operatively carried by the base and operatively attached to the portion and effective to selectively tilt the portion with respect to a remainder of the table surface, and second control means activating the power means in dependent response to movement of the carriage by the first control means.

3. A worktable assembly for machine tools comprising: a worktable positioned adjacent a work station of a machine tool, a first portion of said worktable clear of said machine tool, a section of said first portion hingeably connected to a base support and tiltable with respect to the remainder of the first portion from a horizontal postion substantially co-planar with the remainder of the first portion to an angled to the horizontal position, said first portion including an outside edge of said table, said outside edge extending below the remainder of said table when said section is tilted, power means for tilting said section and for restoring said section from said tilted condition to said horizontal position, control means for controlling said power means, means associated with said worktable for gripping and moving a workpiece with respect to portions of said worktable and to said work station, said control means blocking actuation of said power means when said means for gripping are positioned over said section.

4. In a turret punch assembly having a workpiece with a stationary portion extending from adjacent the turret forwardly thereof flanked by lateral worktable portions having surfaces co-planar with the stationary worktable surface, and a workpiece gripper carriage with grippers movable laterally of the table and longitudinally of the stationary section, the lateral sections of the worktable movable longitudinally of the stationary section along with said grippers, the improvement of at least a portion of one of said lateral support table including an outside edge thereof being tiltable with respect to the remainder of said worktable from a horizontal coplanar position to a position angled to the horizontal with an outside edge below an inside edge of the portion, the portion having anti-friction means associated with a top surface thereof, a linkage between the portion and a non-tiltable base, power means operatively attached to said linkage and said linkage, when acted upon by said power means effective to move said portion between said tilted position and said horizontal position.

5. The assembly of claim 4 wherein the linkage is an overcenter linkage which is self-locking effective to maintain the portion in the horizontal co-planar position.

6. The assembly of claim 4 wherein the workpiece gripper carriage is electronically controlled from a control center and the power means in electronically controlled from the control center with interlock means for preventing actuation of the power means until the gripper carriage has moved to a clear position free of interference with a workpiece positioned on the portion.

7. The assembly of claim 6 wherein additional interlock means are provided preventing actuation of the workpiece gripper carriage when said portion is in a tilted position.

8. The assembly of claim 2 wherein the carriage has at least one movable clamp and the second control means prevents activation of the power means absent withdrawal of the claim from the area of the workpiece.

9. The asembly of claim 3 including automatic gripper means for moving a workpiece on the worktable and circuit means preventing activation of the power means until portions of the gripper means are positioned clear of the workpiece.

* * * * *